United States Patent Office 3,170,473
Patented Feb. 23, 1965

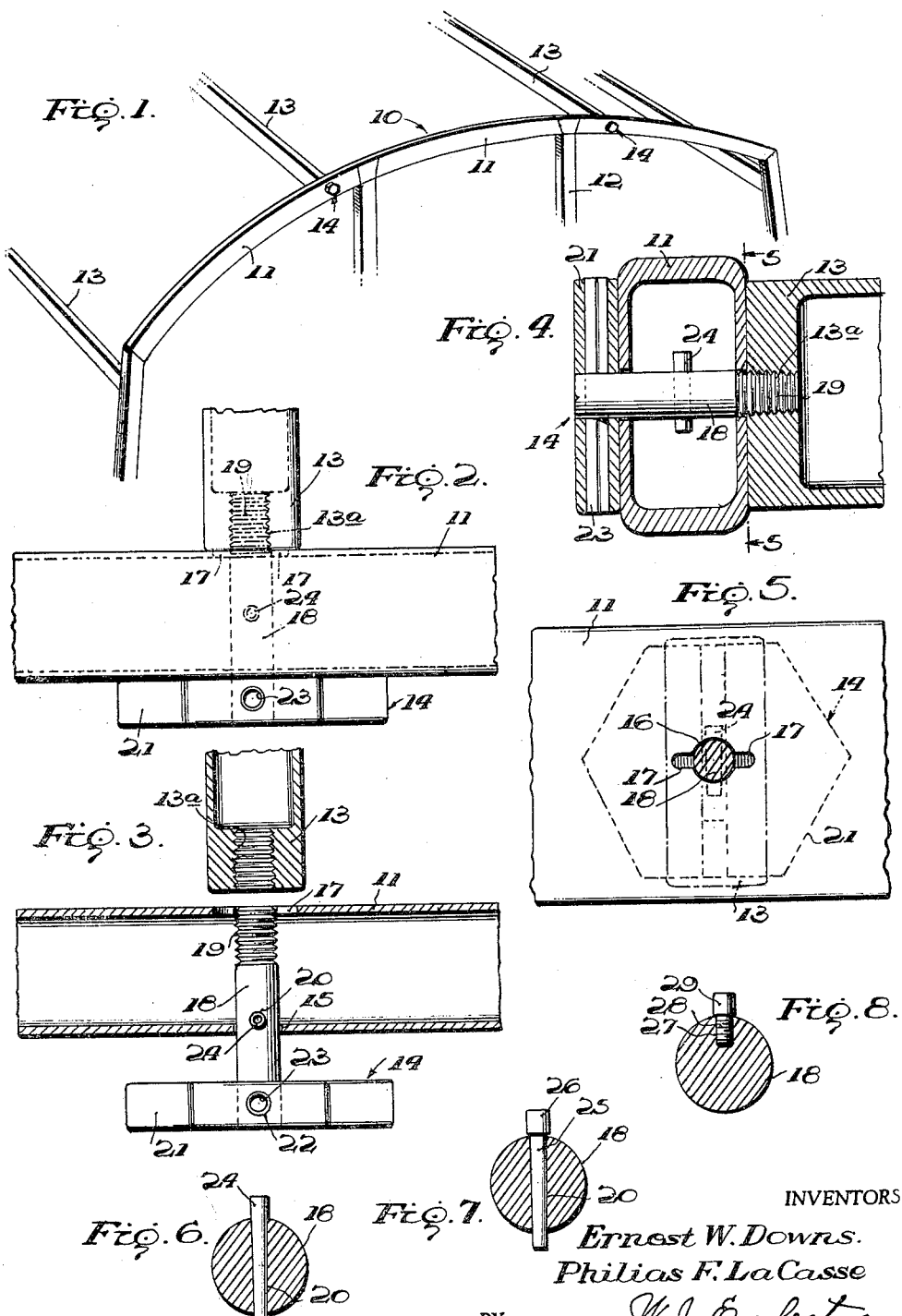
Feb. 23, 1965  E. W. DOWNS ETAL  3,170,473
CAPTIVE BOLT
Original Filed Feb. 19, 1959
INVENTORS
Ernest W. Downs.
Philias F. LaCasse
BY W. J. Eccleston,
ATTORNEY

3,170,473
CAPTIVE BOLT
Ernest W. Downs, Natick, and Philias F. La Casse, Holliston, Mass., assignors to the United States of America as represented by the Secretary of the Army
Continuation of application Ser. No. 794,478, Feb. 19, 1959. This application Sept. 12, 1962, Ser. No. 228,211
1 Claim. (Cl. 135—3)
(Granted under Title 35, U.S. Code (1952), sec. 266)

The invention described herein, if patented, may be manufactured and used by and for the Government for governmental purposes, without the payment to us of any royalty thereon.

This application is a continuation of our copending application Serial No. 749,478, filed February 19, 1959, now abandoned.

The present invention relates to a captive bolt. It has to do particularly, although not exclusively, with a primary stress carrying unit, such as a captive bolt, or captive bolt assembly, for use in assembling or putting together structural members, such as sectional arch members and purlins, to form the frame structure for a sectional arch and purlin type shelter, in which the frame members are usually in the form of hollow or tubular, or channel-shaped metal extrusions. It is to be understood, however, that the present invention is equally well adapted for use in attaching any hollow or tubular structural member to any other hollow or solid structural member or support. A specific use for the captive bolt assembly is as a primary load carrying connection between the purlins and the end arches of tent frames, especially the male end arch of a light metal tent frame to provide a rigid frame type of structure, to counteract the forces applied by wind acting longitudinally.

One of the objects of our invention is to provide new and improved means for securing frame members of a sectional arch to the purlins of a tent structure which are loss-proof and which thereby overcome the problem presented by the excessive loss of conventional bolts heretofore used to connect such structural parts together.

Another object of our invention is to provide a captive bolt, or captive bolt assembly, which is of relatively simple nature, easy to assemble and apply to or remove from the structural frame members or parts, and one which functions as a primary stress carrying unit or member of a frame type structure.

The foregoing and other objects and advantages of the present invention will appear from the following description and appended claim when considered in conjunction with the accompanying drawing forming a part of this specification wherein like reference characters designate corresponding parts in the several views.

In said drawing:

FIG. 1 is a fragmentary perspective view of a male end arch and several purlins of a metal tent frame, showing two of the primary stress carrying units, namely, the captive bolts, or assemblies of the present invention, securing the parts together;

FIG. 2 is a top plan view, on an enlarged scale, showing one of the captive bolt assemblies functioning as a primary stress carrying unit;

FIG. 3 is a view similar to FIG. 2, partly in section, showing the arch, purlin and captive bolt assembly prior to securement of the parts;

FIG. 4 is a further enlarged scale fragmentary vertical sectional view of the assembled parts shown in FIG. 2.

FIG. 5 is a vertical section, partly in elevation, taken substantially along the line 5–5 of FIG. 4, looking in the direction of the arrows;

FIG. 6 is a greatly enlarged cross-sectional view of the bolt shank of the captive bolt assembly, showing one form of transverse loss-preventing pin;

FIG. 7 is a view similar to FIG. 6 but showing another form of transverse loss-preventing pin embodying the present invention; and FIG. 8 is a view similar to FIGS. 6 and 7 showing a transverse threaded stud-like member projecting laterally or transversely from the shank of the captive bolt.

Before explaining in detail the present invention, it is to be understood that the invention is not limited to its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation.

A fragment of an end arch, upright supports, and purlins is shown in FIG. 1 of the drawing, the whole unit being indicated at 10. The unit, as shown, comprises a sectional arch or arch member 11, supported by upright members 12 and removably attached to purlins 13 by beans of the captive bolts or captive assemblies of the present invention, each assembly being shown as a whole at 14.

The arch members, supports and purlins represent a part of a frame structure of a sectional arch and purlin-type shelter, such as the purlins and end arch of a tent frame.

The frame members are preferably in the form of hollow, or tubular, or channel-shaped metal extrusions and may be made from aluminum or magnesium, or any of the light-weight metal alloys. This particular type of shelter or tent is adapted to be shipped in knocked-down condition to various bases in military operations, or for other purposes, and must be of such a construction as to permit the quick and ready assembly of its parts or sections to form the finished structure. It is also essential that the means for attaching or connecting the various parts together be such that they will remain with and as a part of the disassembled part or section without danger of accidental loss or displacement. Into this category falls the captive bolt, or captive bolt assembly 14 of the present invention, being one which, while easy to assemble and to assemble with the parts to be connected together, is provided with the loss-proof means to prevent its being displaced from the part or section to which it is attached.

As seen in FIGS. 2 and 3, the arch member 11 is provided in its forward wall with an opening 15 and in its diametrically opposed rear wall with a similar hole 16 which, however, has slotlike wing portions 17 (see particularly FIGS. 3 and 5). The purlin 13 shown in FIGS 2 and 3 has at its forward end a drilled and internally threaded socket 13a, the purlin otherwise being preferably of tubular construction.

Each of the captive bolt assemblies 14 comprises a shank 18 whose inner end portion is externally threaded at 19 and whose opposite end portion is unthreaded but is provided with a transversely drilled opening (not shown). The unthreaded end of shank 18 receives and supports a head 21 which has a drilled opening 22 formed therein which is adapted to register with the drilled opening or passage (not shown) in the bolt shank 18. The head 21 may take any shape or outline, being shown as hexagonal in the drawing. The head 21 is attached to the shank 18 by means of a springy metal split sleeve or tube 23 which is inserted into the hole 22 and into the registering unnumbered hole in shank 18 to hold and releasably lock the head in position against relative movement with relation to the shank 18.

Intermediate its ends, bolt 18 is provided with a second transverse hole or opening 20 into which is driven a tapered pin 24, see FIG. 6. The pin, as shown, has portions extending or projecting outwardly from opposite sides of shank 18 in substantially a right angle to the axis of said shank. The captive bolt assembly 14 is carried by and forms a removable part of member 11. To assemble the bolt with the arch member 11, the unthreaded end of shank 18 is first inserted through hole 16 in the arch member, with the projecting ends of pin 24 passing through the wing-like slots 17 in the wall of the arch member 11. The pin 24, upon axial movement, will contact the walls of the frame member 11 and thus prevent the accidental displacement or dislocation of the shank 18 from said frame member. Thereafter, to complete the captive bolt assembly 14, the head member or portion 21 is applied to the unthreaded portion of shank 18, the hole 22 being aligned with the hole in shank 18, whereupon the springy metal split sleeve is inserted to hold and releasably lock the head in place upon the shank. Arch member 11 is then moved into contact with purlin 13 and the bolt tightened down, causing its threads 19 to engage the internal threads 13a of the purlin to releasably lock the parts together. Thus, each of the captive bolts 14 serves as a primary stress-carrying unit, or member, and provides for a rigid structure. It will be understood, of course, that the above-described mode of assembly may vary but would be repeated until the entire frame structure of the tent has been set up.

Whereas, it is a simple matter to assemble the frame members to provide the tent frame, it is likewise a simple operation to dismantle them, being merely necessary to back the bolt away from the threaded socket 13a of the purlin 13. The arch member 11 is then removable from the purlin 13 and carries the captive bolt assembly 14 which, as stated above, is prevented from loss or displacement from the member by virtue of the provisions of the loss-proof pin 24.

In FIG. 7, a variation of the loss-preventing means is shown. In this form, the bolt shank 18 has a transverse opening 20 and a cylindrical pin 25 having a head 26 is driven or forced into the opening and is frictionally held therein. As with pin 24, the outer end of pin 25 and its head 26 project beyond the opposite sides of bolt shank 18 in transverse, or lateral directions.

A further modfication of the loss-preventing means of the assembly is shown in FIG. 8. In this view, the bolt shank 18 is provided with a threaded recess 27 which extends inwardly from its periphery toward the center thereof and which is adapted to receive a threaded stud, or the like 28, having a head 29. In this form, the projecting portion or head 29 of the loss-preventing member will serve to prevent accidental displacement of the captive bolt assembly from the arch or frame 11. Other forms of loss-preventing means may, of course, be substituted for the members 24, 25 or 28.

We claim:

In a knockdown portable tent frame adapated to be assembled and disassembled in the field, said tent frame including elongated hollow tubular structural members having two opposed transverse wall openings, one of said openings having diametrically arranged, slot-like wing portions, and elongated stringers adapted to be assembled with said tubular members at right angles thereto, said stringers having integrally formed therewith screw-threaded end sockets; the combination therewith of loss-proof captive bolt assemblies semi-permanently lodged in said tubular members, each of said bolt assemblies comprising a shank transversely extending through said wall opening in said tubular member, one end of said shank being screw-threaded for separable engagement with a screw-threaded end socket in one stringer, said shank having a transverse opening substantially spaced from either end of said shank and so located that the distance by which the engaged screw-threaded end of said shank protrudes from one of said wall openings in said tubular member does not exceed the distance of said shank opening from the other wall opening, a removable pin projecting through said shank opening and normally lodged in the hollow interior of said tubular member for preventing accidental separation of said shank from said tubular member when said tubular member is not engaged with said stringer, said pin being capable of longitudinal insertion through said slot-like wing portions, a removable large head on the other end of said shank for manipulating said shank, and removable locking means for holding said shank and head together.

References Cited by the Examiner

UNITED STATES PATENTS

| 608,892 | 8/98 | Murray. | |
| 1,832,362 | 11/31 | Cullinan | 151–69 |
| 1,870,112 | 8/32 | Hand et al. | 151–69 XR |
| 2,853,078 | 9/58 | Klene | 135–7.1 |
| 2,853,114 | 9/58 | Barry | 159–69 |
| 2,919,736 | 1/60 | Kann | 151–69 |
| 2,921,616 | 1/60 | Threewit et al. | 151–69 |
| 2,929,474 | 3/60 | Boardman | 151–69 XR |
| 2,988,855 | 6/61 | Asfour et al. | 151–69 XR |

FOREIGN PATENTS

| 100,807 | 4/37 | Australia. |
| 756,524 | 9/33 | France. |

HARRISON R. MOSELEY, *Primary Examiner.*

REINALDO P. MACHADO, *Examiner.*